Feb. 6, 1940.　　　　J. A. EDEN　　　　2,188,941
MULTIPLE SPINDLE BORING MECHANISM
Filed March 23, 1938　　　2 Sheets-Sheet 1
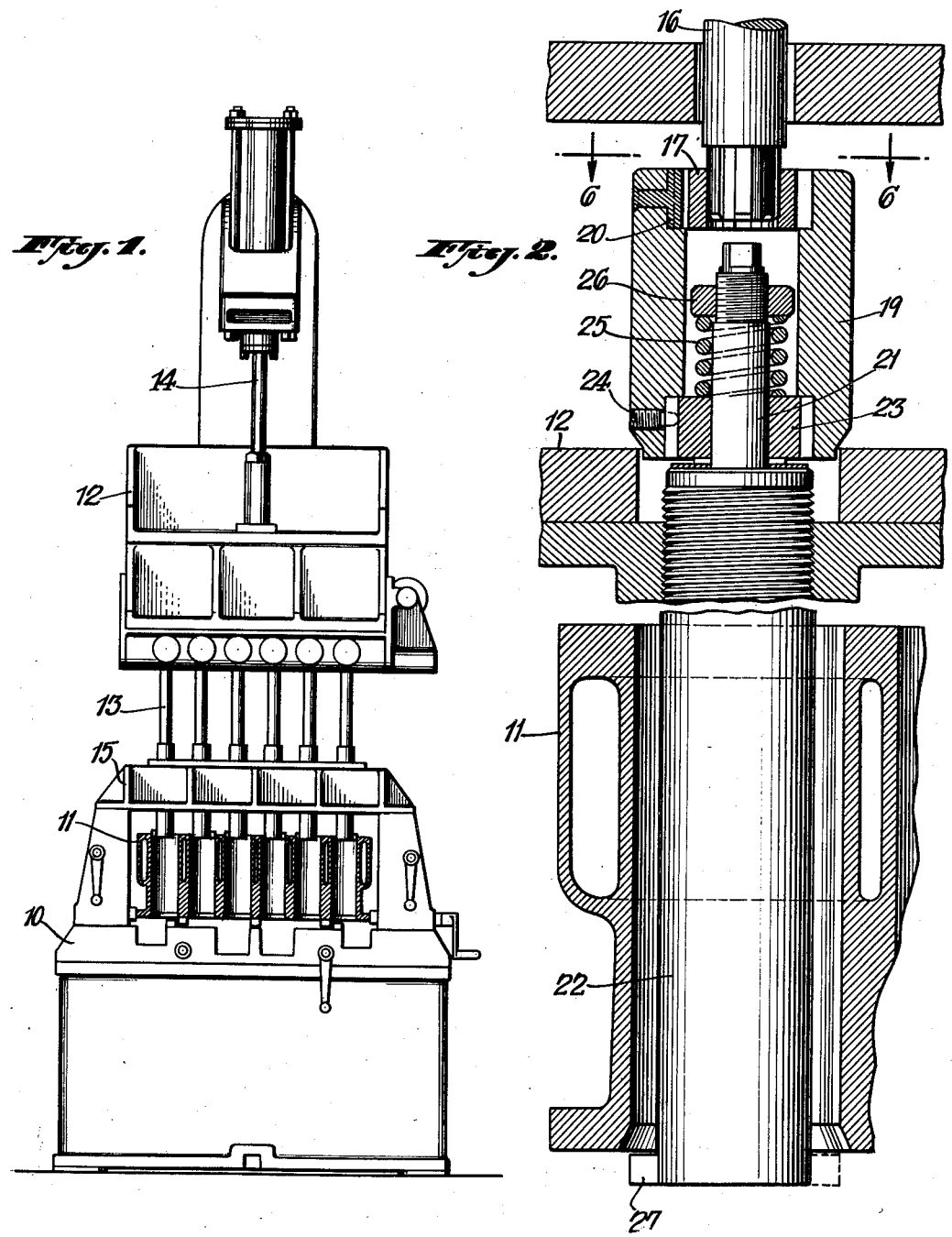
INVENTOR.
JAMES A. EDEN.
BY
Benj. T. Rauber ATTORNEY.

Feb. 6, 1940.   J. A. EDEN   2,188,941
MULTIPLE SPINDLE BORING MECHANISM
Filed March 23, 1938   2 Sheets-Sheet 2
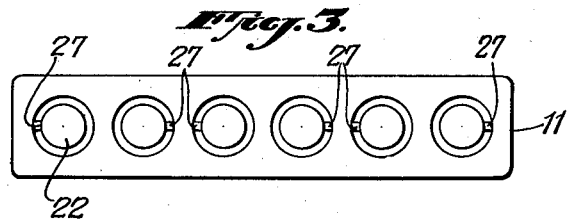
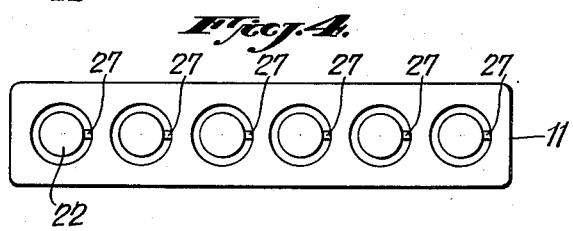
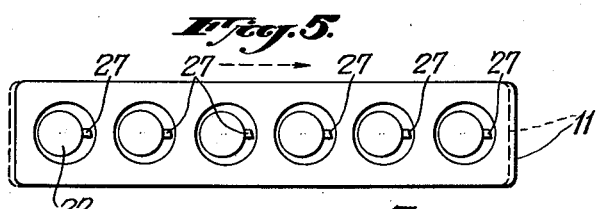
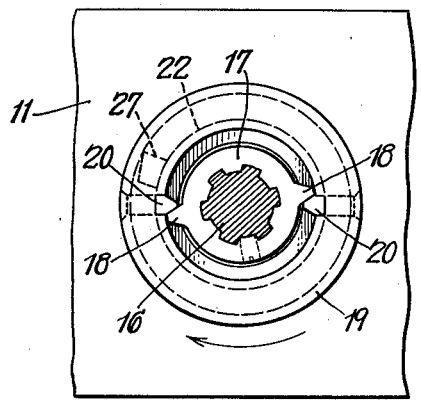
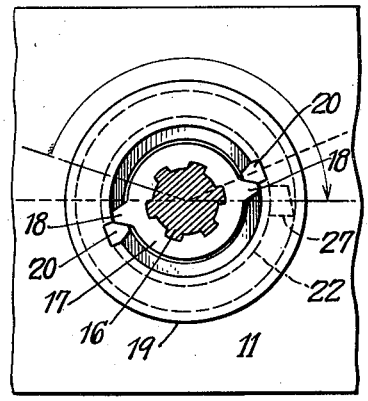
INVENTOR.
JAMES A. EDEN.
BY
Benj. T. Rauber
ATTORNEY.

Patented Feb. 6, 1940

2,188,941

UNITED STATES PATENT OFFICE 2,188,941

MULTIPLE SPINDLE BORING MECHANISM

James A. Eden, Springfield, Mass., assignor to Baush Machine Tool Company, Springfield, Mass., a corporation of Massachusetts Application March 23, 1938, Serial No. 197,543

3 Claims. (Cl. 77—4)

My present invention relates to multiple spindle boring machines of the type in which a number of bores, such as those in multiple cylinder internal combustion engines, are bored simultaneously.

Cylinders and similar articles are bored by the use of a single cutting tool mounted on a boring bar in such manner that its cutting edge or point moves in a helical path of very gradual pitch until it reaches the end of the cylinder or other opening to be bored, thereupon the bar with its cutting tool is withdrawn upwardly through the bore. If the cutting tool were merely drawn upwardly without being moved out of its cutting position, it would score the completed bore in its upper passage. To avoid this scoring, it is customary to shift the workpiece, such as the cylinder, relative to the cutting bar so that the cutting point or edge is spaced slightly inwardly of the surface of the completed bore, whereupon the boring bar may be moved upwardly without danger of scoring the surface of the bore.

When a number of cylinders are bored simultaneously in a multiple boring machine, it is necessary that the cutting points or tools for all of the several bores must point in one direction so that the workpiece may be moved or shifted slightly in this direction to clear the cutting points. For it will be obvious that if certain of the points or cutting elements extend in a direction opposite to that of the others, a shifting of the workpiece in a direction to clear one point would move it still further into the path of the other and aggravate the scoring action.

In apparatus heretofore used it has been necessary, therefore, to have all of the cutting elements point in the same direction or to be in the same phase for each cutting bar.

During the boring each cutter exerts a pressure against the workpiece. When a number of bores are being made on a single workpiece as, for example, a multi-cylinder engine and all of the cutters are in the same relative position, the total thrust or push thus exerted is a sum of all of the thrusts of the individual cutters.

To secure the workpiece against displacement under these concentrated thrusts is difficult in view of the practice or necessity to make the work piece as light as possible and, therefore, readily distortable so that the tightness to which it can be clamped is limited. Also tolerance is, in many cases, very small, amounting in the case of cylinder blocks to less than a thousandth of an inch.

My present invention avoids, or overcomes, the various difficulties mentioned above and provides multiple boring mechanism whereby the cutters may be disposed at complementary positions or angles one to the other so as to balance the side thrust of the cutters during boring and upon the completion of the boring action may be brought to the same relative position or angle so as to clear the bore upon appropriately shifting the workpiece.

The various features of my invention are illustrated by way of example in the accompanying drawings in which Fig. 1 is a vertical elevation or front view of a multiple spindle boring machine embodying my invention, a six-spindle machine being illustrated by way of example. Fig. 2 is a vertical section through a coupling embodying a preferred form of the invention. Fig. 3 is a diagrammatic sketch showing the positions of the cutters during the boring. Fig. 4 is a similar sketch showing the position of the cutters after boring but before the workpiece is shifted. Fig. 5 is a view similar to Fig. 4 but with the workpiece shifted to clear the cutter points. Fig. 6 is a horizontal section taken on line 6—6 of Fig. 2 showing the position of certain coupling elements in driving or boring position. Fig. 7 is a view similar to Fig. 6 showing the cutting bar in a different relative position to the driving element.

In my invention, I provide couplings between certain of the driving spindles and the cutter bars which engage and drive the cutter bars from the spindles at a complementary angle, for example, about 180 degrees from the position of other cutter bars during the boring operation but which permit the boring bar to swing forwardly into the same position, or in phase with the other cutting bars or cutting elements upon the completion of the boring. For this purpose certain of the coupling elements are provided with a driver having engaging or driving surfaces positioned diametrically opposite the axis of rotation when the cutting bar is to be held 180 degrees from the position of an adjacent cutting bar. These driving faces, which may be part of the driving teeth, provide a clear space through which the driven element, which may also comprise a pair of teeth, may swing when the driving elements are stopped. Accordingly, during the boring the driving element acts against the driven element with the cutter acting in the opposite direction from an adjacent or rigidly coupled cutter bar, but upon completion of the boring and stoppage of the driving element, the cutter moves through an arc of 180 degrees until it reaches the same position as the rigidly coupled bar of the machine. This forward rotation of the cutter upon the completion of the boring may be caused by the momentum of the cutter bar and associated elements, or manually or by any other suitable means.

Referring more particularly to the accompanying drawings, the invention is shown applied to a machine having a bed 10 on which a workpiece 11 may be mounted for boring, and a vertically movable head 12 from which depend a number of spindles or cutting bars 13. Any number of spindles may be employed, six being shown by way of example, for boring a six-cylinder engine block. Power may be transmitted to the cutting bars 13 from a main drive shaft 14 through any suitable mechanism in the head 12. The cutting bars 13 are guided immediately above the workpiece 11 by a suitable guiding element 15. Certain of the cutting bars 13, depending upon the number of bars and the arrangement of the couplings, are coupled directly or rigidly to the driving elements, others have a coupling arrangement as shown in Figs. 2 to 7 inclusive.

In this arrangement a drive spindle 16, driven by any suitable mechanism from the main drive shaft 14, has splined to its lower end a driving element or driver 17. This driver 17 may be secured to the spindle 16 by such screw or other suitable means to prevent it from falling therefrom.

As shown more particularly in Fig. 6, the driver 17 is provided with a pair of diametrically opposite teeth 18. Encircling the driver 17 is a coupling 19 having a pair of diametrically oppositely pointing or opposed teeth 20 positioned to be engaged and driven by the teeth 18. The coupling 19 extends below the level of the driver 17 and is hollow to receive a stem 21 extending upwardly from the upper end of a cutter bar 22. The stem 21 projects upwardly through a gear tooth 23 which is secured in the lower part of the coupling 19 by means of a set screw 24 which may be inserted between any of a pair of gears of the gear wheel 23 to enable the position of the cutter bar 22 to be adjusted to any angle relative to the coupling 19.

The cutter bar 22 is held resiliently upwardly against the gear 23 by means of a spring 25 confined between the upper face of the gear 23 and a nut 26 on the upper part of the stem 21. The cutter bar 22 carries a cutter 27 at its cutting end. The arrangement of the various elements 23, 26 is shown merely conventionally, not being a part of the present invention.

During the boring operation the elements of the above coupling will be in the position shown in Fig. 6, the direction of rotation being as shown by the arrow and with the teeth 18 of the drive 17 acting against the teeth 20. If every alternate boring bar or tool is provided with such a coupling, whereas the others are provided with a direct rigid coupling, the boring teeth 27 during the boring operation may be in the position shown in Fig. 3.

For example, in this figure the first, third and fifth boring elements may be provided with the above coupling. It will be apparent, therefore, that the radial thrusts of the respective cutting tools is in each case directly opposite to and balances the thrust of the adjacent boring tool and that the result of these various thrusts is approximately zero.

When the boring tool has completed the boring operation and has moved through the workpiece to the position shown in Fig. 2, the driving spindle 16 is stopped by cutting off the power and applying the brake.

As the coupling and the boring bars are now free to move under their momentum, they may swing as indicated by the arrow at the lower part of Fig. 6 to the position shown in Fig. 7 in which the teeth 20 have rotated approximately 180 degrees until stopped by the contact with the opposite faces of the teeth 18. The several cutters will then be in the position shown in Fig. 4; that is, all pointing in one direction as, for example, to the right. The workpiece may now be shifted slightly to the right, that is from the position shown in dotted lines in Fig. 5 to that shown in full lines, which will leave a clearance between the cutting edge of the cutters and the completed bores of the workpiece. The workpiece may thereupon be lowered without any danger of scoring the bore by the relatively upward movement of the cutters.

It will be apparent that instead of having the cutters point diametrically opposite, they might be at different complementary angles in which there would be a balance between more than two cutters. For example, three cutters might be balanced at angles of 120 degrees. In such case, there would be a driving tooth 18 and an additional stopping tooth placed at an appropriate angle of 120 degrees. Similarly, other angles could be employed with other combinations of cutting tools.

Also it will be understood that other means than the momentum of the cutter tools may be employed for carrying them from the position of Fig. 6. In restarting the work it will be understood that the couplings will be returned to the position of Fig. 6 before reboring another workpiece.

Through the above invention I have provided a very simple and effective coupling whereby certain cutters in a multiple cutting or boring machine may be arranged at complementary thrust angles during boring and be brought to alignment before removal from the workpiece.

Various modifications may be made by those skilled in the art without departing from the invention as defined in the appended claims.

What I claim is:

1. In a multiple spindle machine, a driving spindle, a driven tool bar and a coupling between said spindle and said bar, said coupling comprising a driver mounted on said spindle and having a pair of diametrically positioned driving teeth, a hollow coupling secured to the tool bar and extending upwardly to enclose said driver and having diametrically positioned teeth engaging the teeth of said driver, said coupling being free to rotate in advance of said driver until its teeth engage the opposite sides of the driving teeth in advance.

2. In a multiple spindle machine, a driving spindle, a driven tool bar and a coupling between said spindle and said bar, said coupling comprising a driver mounted on said spindle and having symmetrically positioned driving teeth, a hollow coupling to drive the tool bar and extending upwardly to enclose said driver and having symmetrically positioned teeth corresponding to and engaging those of said driver, said coupling being free to rotate in advance of said driver until their teeth engage the opposite sides of the teeth in advance.

3. A multiple boring machine having a number of driving spindles and a corresponding number of driven tool bars, at least one of said tool bars being directly connected to said driving spindle, others of said tool bars being connected to their respective driving spindles through a coupling, each coupling having driven teeth, a driver having teeth engaging and driving those of said coupling when the cutting element of the respective tool bar is complementary in thrust to that of adjacent tool bars, said coupling being rotatable in advance of said driving teeth sufficiently to bring its cutter elements in phase with that of the directly coupled tool bar.

JAMES A. EDEN.